(12) United States Patent
Griswold

(10) Patent No.: US 11,284,602 B2
(45) Date of Patent: Mar. 29, 2022

(54) ANIMAL FEEDING APPARATUS AND METHOD

(71) Applicant: Timothy Lee Griswold, Sanger, TX (US)

(72) Inventor: Timothy Lee Griswold, Sanger, TX (US)

(*) Notice: Subject to any disclaimer, the term of this patent is extended or adjusted under 35 U.S.C. 154(b) by 235 days.

(21) Appl. No.: 16/673,394

(22) Filed: Nov. 4, 2019

(65) Prior Publication Data
US 2020/0275634 A1 Sep. 3, 2020

Related U.S. Application Data

(60) Provisional application No. 62/812,999, filed on Mar. 2, 2019.

(51) Int. Cl.
*A01K 5/02* (2006.01)

(52) U.S. Cl.
CPC .......... *A01K 5/0225* (2013.01); *A01K 5/0291* (2013.01)

(58) Field of Classification Search
CPC ...... A01K 5/0225; A01K 5/0291; A01K 5/02; A01K 5/0283
See application file for complete search history.

(56) References Cited

U.S. PATENT DOCUMENTS

| | | | | |
|---|---|---|---|---|
| 2,984,209 A | * | 5/1961 | Malloy, Sr. ......... | A01K 39/012 119/52.2 |
| 3,180,316 A | * | 4/1965 | Chatfield ............ | A01K 5/0291 119/51.12 |
| 3,452,716 A | * | 7/1969 | Molimard ........... | A01K 5/0291 119/56.2 |
| 3,587,530 A | | 6/1971 | Blair | |
| 3,918,405 A | * | 11/1975 | Hostetler ............. | A01K 39/01 119/57.3 |
| 4,079,699 A | * | 3/1978 | Longmore .......... | A01K 5/0291 119/51.11 |
| 4,256,054 A | * | 3/1981 | Hitchcock .......... | A01K 5/0291 119/51.11 |
| 4,497,280 A | * | 2/1985 | Sanstrom ............ | A01K 5/0291 119/51.11 |
| 4,913,096 A | * | 4/1990 | LeBlanc ............. | A01K 5/0291 119/53.5 |
| 5,433,171 A | * | 7/1995 | Ewell ................. | A01K 5/0291 119/51.5 |
| 5,819,686 A | * | 10/1998 | Credeur ............. | A01K 5/0225 119/51.5 |
| 6,481,374 B1 | | 11/2002 | Lillig | |
| 2015/0143750 A1 | * | 5/2015 | Jalbert ................ | A01K 5/0291 49/25 |

* cited by examiner

*Primary Examiner* — Ebony E Evans
(74) *Attorney, Agent, or Firm* — Poznak Dyer Kanar Schefsky Thompson PLC; Robert C. Corbett

(57) ABSTRACT

An animal feeder apparatus includes a hopper defining a cavity configured to store granular animal feed; a cup mounted with respect to the hopper and defining a concavity; and a spout defining a passageway. The spout and passageway are positioned such that, when the cavity contains the granular animal feed, the granular animal feed flows from the cavity, through the passageway, and into the concavity of the cup. The cup, hopper, and passageway are configured and arranged such that the animal feed does not flow as a result of granular friction when the concavity contains more than a predetermined amount of feed.

3 Claims, 4 Drawing Sheets

ANIMAL FEEDING APPARATUS AND METHOD

CROSS REFERENCE TO RELATED APPLICATION

This application claims the benefit of U.S. Provisional Patent Application No. 62/812,999, filed Mar. 2, 2019, and which is hereby incorporated by reference in its entirety.

BACKGROUND OF THE INVENTION

Animal feeders may be used, for example, to either attract wildlife to a particular location or to assist the growth and health of a present wildlife population. Animal feeders typically store and dispense corn or other food.

SUMMARY

An animal feeder apparatus includes a hopper defining a cavity configured to store granular animal feed; a cup mounted with respect to the hopper and defining a concavity; and a spout defining a passageway. The spout and passageway are positioned such that, when the cavity contains the granular animal feed, the granular animal feed flows from the cavity, through the passageway, and into the concavity of the cup. The cup, hopper, and passageway are configured and arranged such that the animal feed does not flow when the concavity contains more than a predetermined amount of feed.

The animal feeder apparatus may also include a gate member that is movable between a closed position and an open position. In the closed position, the gate member sufficiently obstructs the passageway such that the granular flow of feed through the passageway is prevented. In the open position, the gate member does not obstruct the passageway that prevents the granular flow of feed therethrough. An actuator is operatively connected to the gate member and configured to selectively cause the gate member to move between its open and closed positions. The animal feeder assembly is configured such that energy is not required to maintain the gate member in either the open position or the closed position. Accordingly, the gate member can remain in both the open position and the closed position without the actuator using energy from a battery or other electrical energy source.

The animal feeder apparatus improves upon the prior art by automatically regulating the amount of feed dispensed in the cup. More specifically, when the gate member is in the open position, feed is dispensed from the hopper only as it is being consumed by deer or other animals feeding from the cup, i.e., feed flows into the cup when the amount of food in the cup is less than the predetermined amount, and the feed automatically stops flowing into the cup as a result of granular friction when the amount of food in the cup is the predetermined amount. Accordingly, when the gate member is in the open position, feed is not wasted by being dispensed onto the ground if it is not consumed.

The animal feeder apparatus also improves upon the prior art by enabling control of feeding times without excessive depletion of a battery or other energy source. More specifically, by retaining the gate member in the open position without requiring energy to the actuator, the gate member can be left open for longer periods of time, thereby permitting a control system to release feed only at designated times of the day.

A corresponding method is also provided.

The above features and advantages and other features and advantages of the present disclosure are readily apparent from the following detailed description of the best modes for carrying out the disclosure when taken in connection with the accompanying drawings

DETAILED DESCRIPTION

Figure 1:
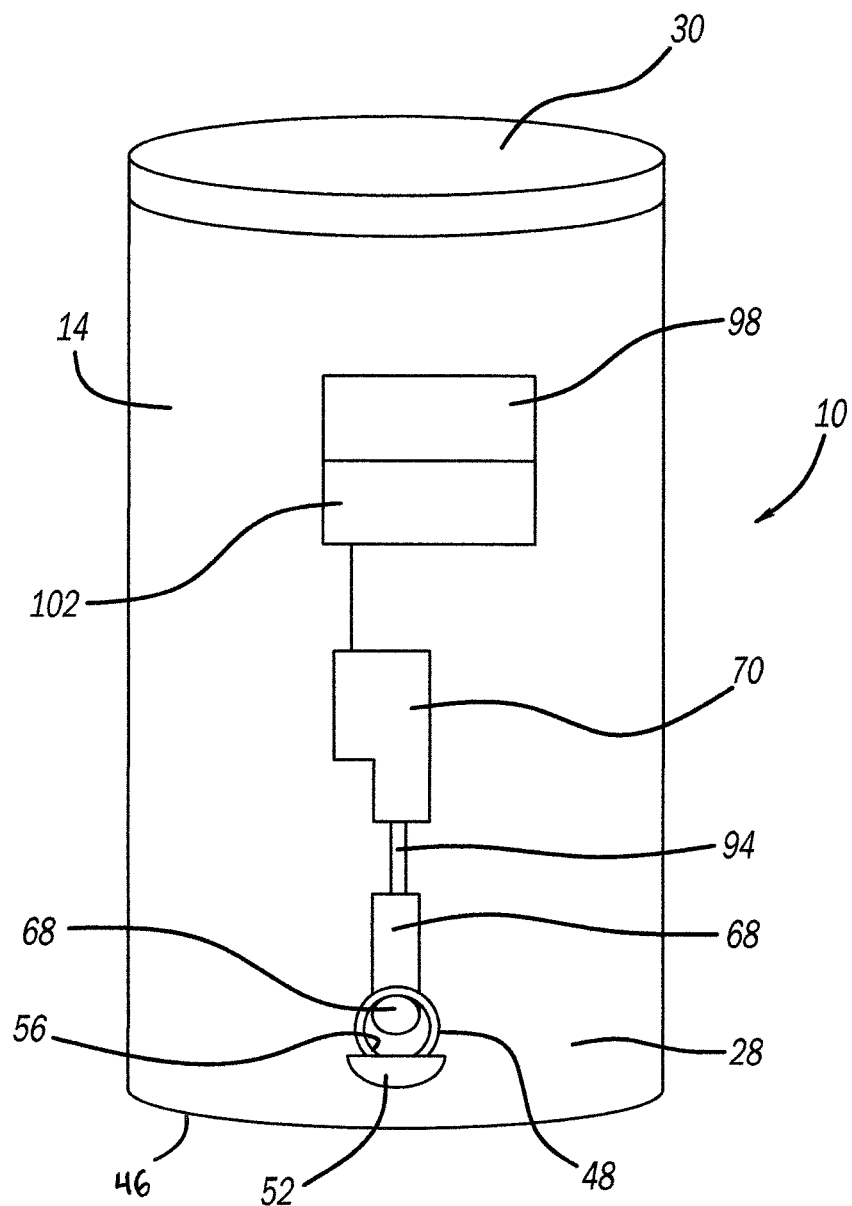
FIG. 1 is a schematic, side view of an animal feeder.

Referring to the Figures, wherein like reference numbers refer to like components throughout, an animal feeder 10 is schematically depicted. The animal feeder 10 includes a hopper 14 for storing granular feed 18, such as the corn kernels depicted. Other granular feed, such as pellets, may also be used. The hopper 14 in the embodiment depicted is cylindrical and defines a substantially cylindrical interior cavity or chamber 22 having a circular opening 26 at the top of the hopper 14, though the hopper 14 and chamber 22 may be any shape within the scope of the claims. More specifically, the hopper 14 includes a cylindrical wall 28 that at least partially defines the chamber 22. The feeder 10 includes a lid or cover member 30 that obstructs the opening 26 to protect the food inside the chamber 22 and that is selectively removable so that additional food can be added to the chamber 22 through the opening 26 as desired.

Figure 2:
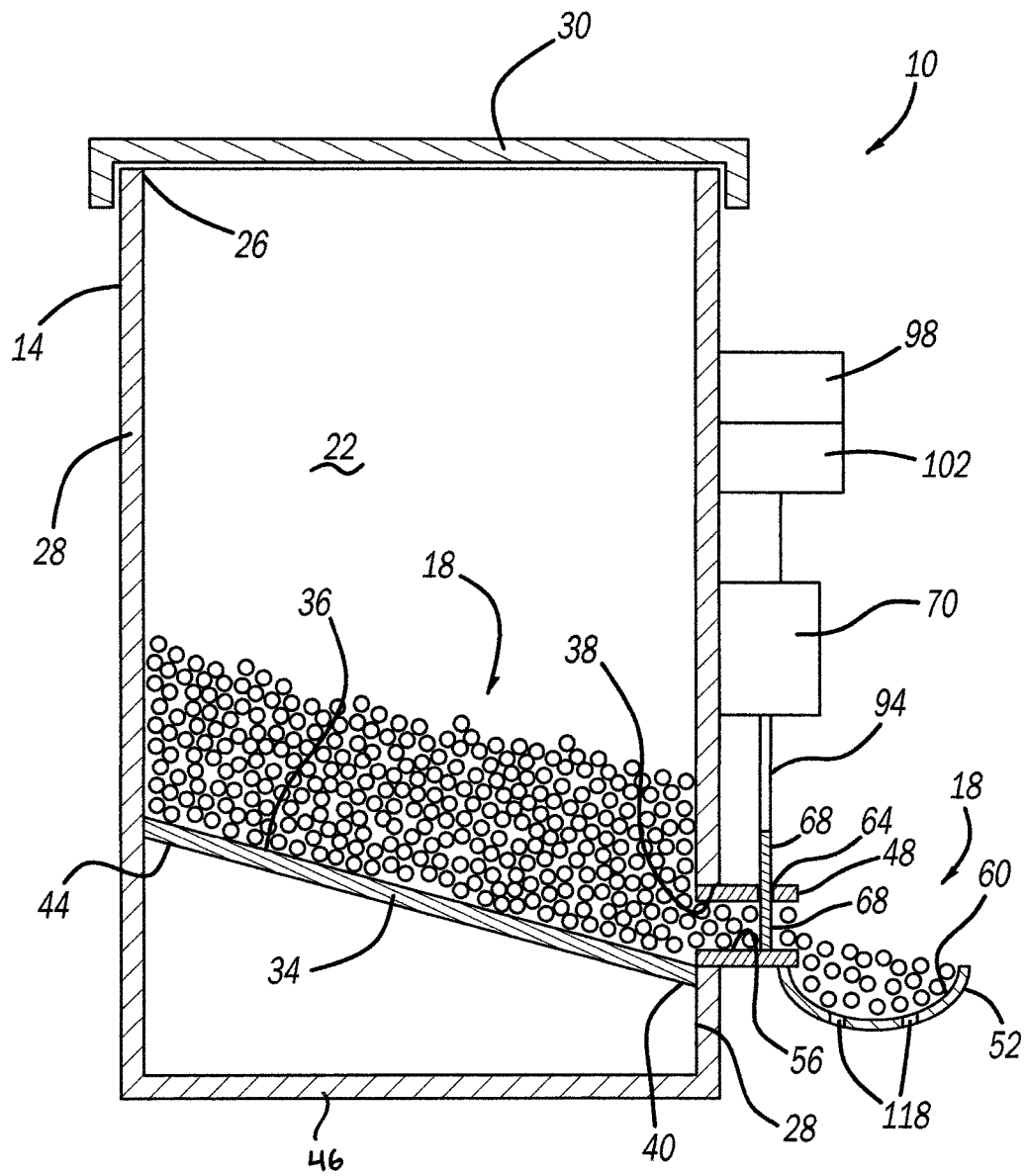
FIG. 2 is a schematic, cross-sectional, side view of the animal feeder

The feeder 10 includes a flat, substantially planar panel 34 that defines the bottom surface 36 of the chamber 22. The wall 28 of the hopper 14 defines an aperture 38 adjacent the bottom of the hopper 14. The panel 34 is inclined relative to the wall 28 such that, as shown in FIG. 2, the surface 36 increases in elevation with increasing distance from the aperture 38. In the embodiment depicted, one side 40 of the panel 34, which is most proximate to the aperture 38, is below the aperture 38; another side 44 of the panel 34, which is most distant from the aperture 38, is above the aperture 38. Accordingly, the incline of the surface 36 causes the feed 18 resting thereon to be urged toward and through the aperture 38 by the action of gravity. In the embodiment depicted, the hopper 14 includes a base portion 46 that provides a flat, horizontally-oriented lower surface of the hopper, though other base configurations may be employed.

The feeder 10 also includes a spout 48 and a cup 52. In the embodiment depicted, the spout 48 is a tube defining a cylindrical passageway 56. The spout 48 is mounted with respect to the wall 28 such that the passageway 56 is aligned with or is at least partially coextensive with the aperture 38. The cup 52 defines a concavity 60 that is upwardly open and unobstructed. The cup 52 is mounted with respect to the spout 48 such that the concavity 60 is lower than the passageway 56. The spout 48 also defines a slot 64. As used herein, a "spout" may be any structure that guides the flow of feed 18 from the chamber 22 to the concavity 60 of the cup 52. Correspondingly, the passageway 56 may have various lengths and shapes within the scope of the claimed invention. For example, a "spout" may be a portion of the wall 28, and a "passageway" may be a hole or aperture formed in the wall within the scope of the claimed invention. Similarly, a "cup" may be any receptacle defining a concavity of any size and shape for receiving the feed 18 from the hopper 14.

Figure 3:
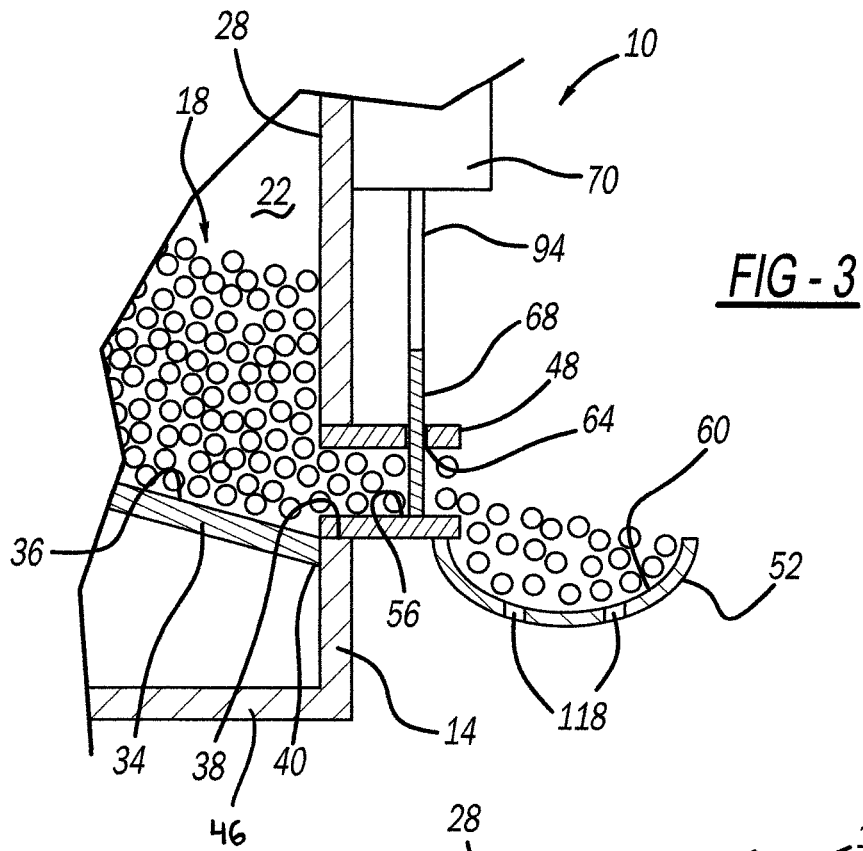
FIG. 3 is a schematic, cross-sectional, side view of a portion of the animal feeder, including a spout and a gate member in a closed position.
Figure 4:
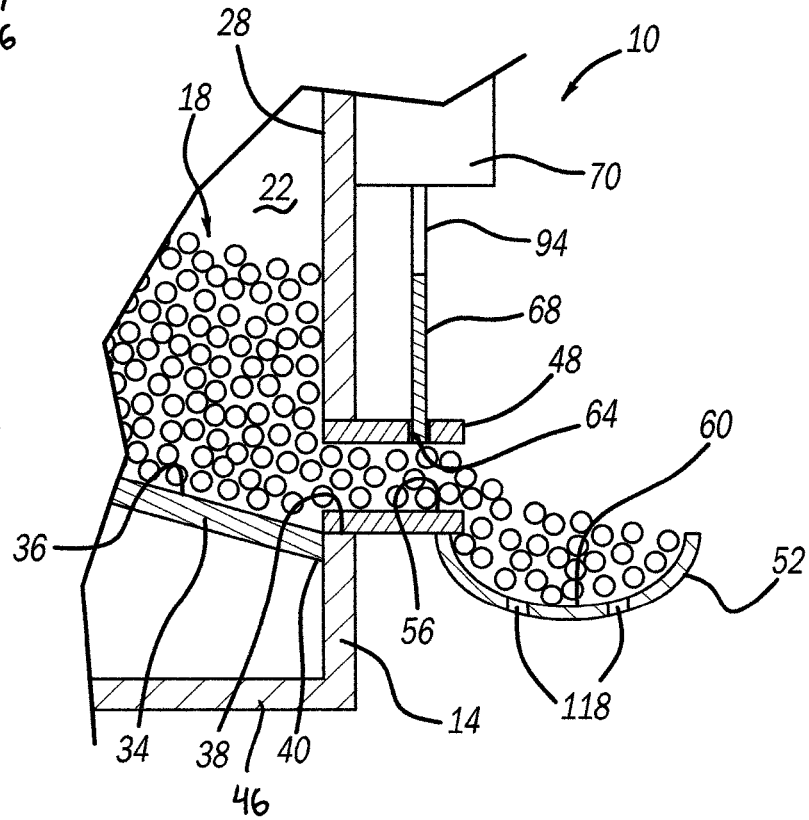
FIG. 4 is a schematic, cross-sectional, side view of a portion of the animal feeder, including a spout and a gate member in an open position.

The feeder 10 also includes a gate member 68 that is movably mounted with respect to the spout 48. More specifically, the gate member 68 is selectively movable between a closed position, as shown in FIGS. 2 and 3, and an open position, as shown in FIG. 4. Referring specifically to FIGS. 2 and 3, the gate member 68 in the closed position extends through the slot 64 and completely obstructs the passageway 56, thereby preventing the granular flow of feed 18 through the passageway 56. Referring specifically to FIG. 4, the gate member 68 in the open position does not obstruct the passageway 56.

When the passageway 56 is unobstructed, gravity causes feed 18 in the chamber 22 to flow granularly through the aperture 38 and the passageway 56 and into the concavity 60 of the cup 52. The angle of inclination of surface 36, the dimensions and orientation of passageway 56, and the size and placement of the concavity 60 relative to the spout 48 are selected such that granular flow of the feed 18 from the chamber 22 of the hopper 14 into the concavity 60 of the cup 52 occurs only when the amount of feed 18 in the concavity 60 is less than a predetermined amount. In the embodiment depicted, the predetermined amount of feed 18 is the amount that fills the concavity 60. Thus, when the concavity 60 is not full of feed 18, the feed 18 granularly flows through the passageway 56; when the concavity 60 is full 18, granular friction prevents the continued flow of feed 18 from the hopper 14 and thus prevents feed 18 from overflowing out of the cup 52.

Figure 5:
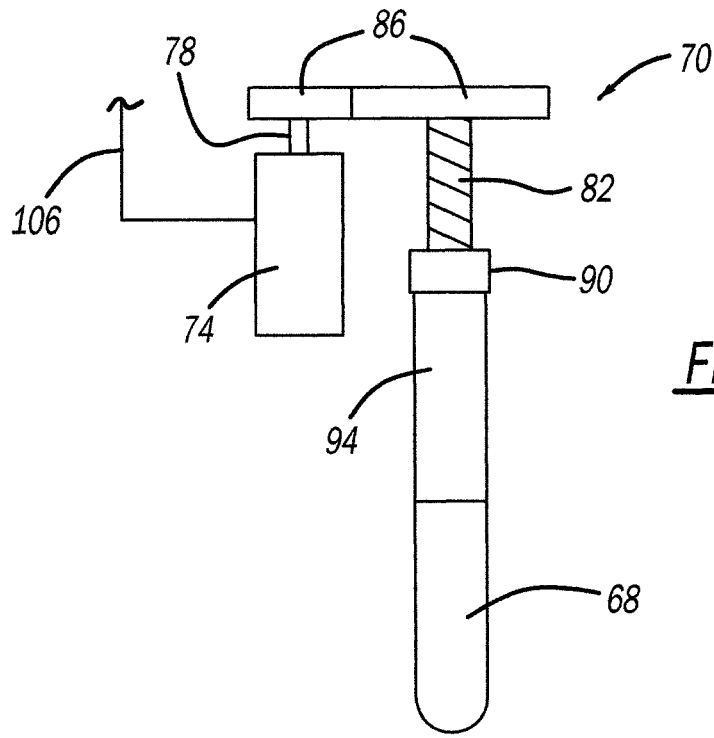
FIG. 5 is a schematic, side view of an actuator operatively connected to the gate member.

The feeder 10 includes an actuator 70 that is mounted with respect to the hopper 14 and operatively connected to the gate member 68 to selectively cause the movement of the gate member 68 between the open and closed positions. Referring specifically to FIG. 5, the actuator 70 in the embodiment depicted is a linear actuator having an electric motor 74. The electric motor 74 has an output member, i.e., rotor 78, that is operatively connected to a leadscrew 82 to selectively transmit torque thereto. In the embodiment depicted, a plurality of gears 86 interconnect the rotor 78 and the leadscrew 82 for the transmission of torque and rotary motion from the rotor 78 to the leadscrew 82.

The leadscrew 82 defines external threads, as understood by those skilled in the art. A nut 90 having internal threads is engaged with the threads on the leadscrew 82, as understood by those skilled in the art. Accordingly, rotation of the leadscrew 82 causes linear translation of the nut 90. Thus, when the motor 74 is energized, the rotor 78 rotates, causing the leadscrew 82 to rotate, which in turn causes linear movement of the nut 90. The actuator 70 includes an output member 94 that is operatively connected to the nut 90 for unitary movement therewith. The gate member 68 is connected to the output member 94 for unitary movement therewith. Accordingly, rotation of the rotor 78 causes linear movement of the gate member 68. It should be noted that, within the scope of the claimed invention, the gate member 68 may be directly connected to the nut 90; in such a configuration, the nut 90 is also an "output member" of the actuator 70.

The feeder 10 includes a source of electrical energy, which, in the embodiment shown, is a battery (shown at 98 in FIGS. 1, 2, and 6) mounted with respect to the hopper 14. The motor 74 is operatively connected to the battery 98 via a control system 102. The control system 102 controls the flow of electrical energy from the battery 98 to the motor 74. The motor 74 uses electrical energy from the battery 98 to cause rotation of the leadscrew 82 and corresponding linear translation of the nut 90, output member 94, and gate member 68.

The actuator 70 is configured such that the gate member 68 remains stationary in the absence of electrical energy supplied to the motor 74. Thus, the gate member 68 remains in the open and closed positions without the use of electrical energy from the battery 98. More specifically, and as understood by those skilled in the art, the nut 90, and therefore the gate member 68, does not move linearly with respect to the leadscrew 82 unless the motor 74 causes the leadscrew 82 to rotate. Thus, electrical energy from the battery 98 is not necessary for the gate member 68 to maintain any position. It should be noted that other actuator arrangements that do not require energy to retain the gate member 68 in the open or closed position may be employed within the scope of the claimed invention.

Figure 6:
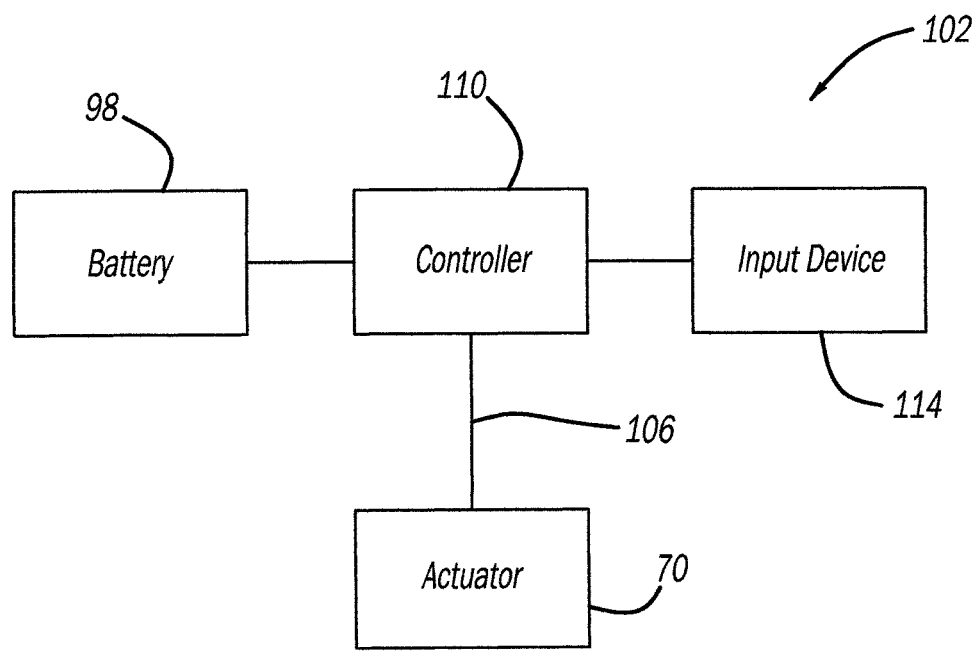
FIG. 6 is a schematic, side view of a control system operatively connected to the actuator.

An electrically conductive pathway 106 operatively interconnects the motor 74 to the control system 102 such that the rotation of the rotor 78, and, correspondingly, the leadscrew 82, is controlled by the control system 102. The conductive pathway 106 may, for example, by provided by a plurality of wires. Referring specifically to FIG. 6, the control system 102 in the embodiment depicted includes an electronic controller 110 that is operatively connected to the battery 98 and the actuator 70 to control the amount of electrical energy from the battery 98 to the actuator 70. The control system 102 also includes an input device 114 that is user-operable to program the controller 110 to cause the gate member 68 to open and close at desired times. Those skilled in the art will recognize a variety of input device 114 configurations that may be employed within the scope of the claimed invention. For example, in one embodiment, the input device 114 is a touch-screen display.

A user of the feeder 10 may place the feeder in a desired location, for example, in a place where the user would like deer or similar animals to become habituated to finding food. The user will then, using the input device 114, input to the controller desired times when the gate member 68 will be moved to the open position and desired times when the gate member 68 will be moved to the closed position. For example, a user may instruct the controller 110 to cause the gate member 68 to move to its open position at 6:00 AM, to move to the closed position at 9:00 AM, then move to its open position again at 6:00 PM and then its closed position at 9:00 PM. Accordingly, the gate member 68 will remain open for three hours in the morning and three hours in the evening and remain closed the remainder of the time.

When the gate member 68 is in the open position, deer will be able to eat as much food as they desire from the cup 52; as feed from the cup 52 is consumed, more feed 18 is gravity-fed from the chamber 22 through the passageway 56 and into the concavity 60 of the cup 52. If feed 18 is not consumed from the cup 52, then the granular flow of feed 18 through the passageway 56 ceases when the concavity 60 is full due to granular friction. When the gate member 68 is in the closed position, the gate member 68 will prevent feed from flowing from the chamber 22 to the cup 52 and the deer will not be able to eat the feed 18 once the concavity 60 is depleted. In this way, deer can be trained to frequent the feeder 10 at predetermined times. It should be noted that other control system configurations may be employed within the scope of the claimed invention, including, but not limited to, the use of mechanical or electronic timers, relays, etc.

As shown in FIGS. 2-4, the cup 52 defines a plurality of holes 118 at the bottom of the concavity 60. The holes 118 are smaller than the granular feed 18. Accordingly, holes 118 permit the drainage of water from the concavity in the event of rain or other precipitation, but are too small to permit passage of feed 18 therethrough.

While the best modes for carrying out the disclosure have been described in detail, those familiar with the art to which this disclosure relates will recognize various alternative designs and embodiments for practicing the disclosure within the scope of the appended claims.

The invention claimed is:

1. An animal feeder comprising:
a hopper defining a chamber configured to store granular animal feed;
a cup mounted with respect to the hopper and defining a concavity; and
a spout defining a passageway and positioned such that, when the chamber contains the granular animal feed, the granular animal feed flows from the chamber, through the passageway, and into the concavity of the cup;
wherein the cup, hopper, and passageway are configured and arranged such that the animal feed does not flow through the passageway when the concavity contains more than a predetermined amount of feed;
a gate member movably mounted with respect to the spout for movement between a closed position and an open position;
wherein the gate member in the closed position sufficiently obstructs the passageway such that the gate member prevents granular flow of feed through the passageway;
wherein the gate member in the open position does not obstruct the passageway, thereby permitting granular flow of feed through the passageway;
a source of electrical energy;
an actuator operatively connected to the source of electrical energy to receive electricity therefrom;
said actuator having an output member operatively connected to the gate member and configured to selectively move the gate member between the open and closed positions in response to the actuator receiving electricity;
wherein the animal feeder is configured such that electricity is not required to maintain the gate member in the open position;
wherein the actuator includes a lead screw, an electric motor operatively connected to the lead screw to selectively cause rotation of the lead screw, and a nut in engagement with the lead screw such that rotation of the lead screw causes linear translation of the nut;
said nut being operatively connected to the gate member.

2. The animal feeder of claim 1, wherein the cup, hopper, and passageway are configured and arranged such that the animal feed does not flow through the passageway when the concavity contains more than a predetermined amount of feed as a result of granular friction.

3. The animal feeder of claim 1, further comprising a control system operatively connected to the actuator to control the position of the gate member; and said control system including an input device via which the control system is programmable to cause the gate member to move between its open and closed positions at predetermined times.

* * * * *